252-402 SR Reference SEARCH ROOM
FIF8306 XR 2,130,322

Patented Sept. 13, 1938 2,130,322

UNITED STATES PATENT OFFICE 2,130,322

STABILIZATION OF HYDROXY BENZENOID COMPOUNDS AND TETRAVALENT SULPHUR COMPOUNDS AGAINST METAL CATALYSTS

Morris S. Kharasch, Chicago, Ill., assignor to Eli Lilly and Company, Indianapolis, Ind., a corporation of Indiana No Drawing. Application May 14, 1934, Serial No. 725,483

32 Claims. (Cl. 23—250)

It is the fundamental object of my invention to stabilize more effectively than has heretofore been done certain very easily oxidized benzenoid compounds, particularly those containing two negative substituents in ortho and para positions on the aromatic nucleus.

By "negative substituents," I mean amino-groups or alkyl- or aryl-substituted-amino-groups, or hydroxy groups, or radicals containing characteristic groupings of one or more of these groups.

It is a further object of my invention to produce certain stabilized and stable tetravalent-sulphur salts, by which term I include sulphites and hyposulphites; which in turn will serve as stabilizers for the benzenoid compounds above referred to and for other things, in addition to being stable themselves for such uses as they may serve.

It is well known that certain benzenoid compounds, such as o-aminophenol, p-aminophenol, p-phenylenediamine, catechol, hydroquinone, metal, and epinephrin, oxidize very rapidly under certain conditions, especially in solution, and more especially in neutral and alkaline solution and indeed at any pH on the alkaline side of about pH 6; and that the oxidation increases under the action of heat and light. This oxidation is due to oxygen of the air. No water solutions which are stable at room or elevated temperatures have been prepared of these compounds.

It is also known that a certain stabilization of such benzenoid compounds, even in water solution, can be obtained by adding sodium sulphite, which preferentially takes up the oxygen. Sodium sulphite, however, is very sensitive to catalytic oxidation by oxygen in the presence of certain metal ions; chiefly copper, but also manganese and iron in the order named. Since it is substantially impossible to prepare either sodium sulphite or the benzenoid compounds free from these metal catalysts, which are catalytically effective in infinitesimal amounts, the value of sodium sulphite in stabilizing these benzenoid compounds is only temporary.

Thus one way of achieving stabilization of the benzenoid compounds mentioned above resolves itself into the production of a stabilized or stable sulphite; so that such stabilized or stable sulphite may be added to the benzenoid compounds referred to, to stabilize them in turn.

I have discovered both how to stabilize known tetravalent-sulphur salts, such as sodium sulphite, sodium hyposulphite ($Na_2S_2O_4$, commonly known in the trade as sodium hydrosulphite), and others; and also how to produce certain inherently stable tetravalent-sulphur salts, both sulphites and hyposulphites, which are new. By such stabilized or stable tetravalent-sulphur salts I can produce an effective and relatively permanent stabilization of the easily oxidized benzenoid compounds above referred to.

Stabilized and stable tetravalent-sulphur salts and their production are included in the generic subject-matter of my copending application Serial No. 725,482, filed May 14, 1934; and the present application is directed to them specifically, as well as to the stabilization of benzenoid compounds by them.

Broadly speaking, my stabilization of tetravalent-sulphur salts, whether of an alkali-metal sulphite or hyposulphite or by the production of an inherently stable sulphite or hyposulphite, is by having an aliphatic 1,2-diamine present, either as a separate added ingredient, in addition to the sulphite or hyposulphite, or as the "basic" part of the sulphite or hyposulphite or of some co-present substance. That is, from a generic standpoint, the aliphatic diamines may be either added ingredients initially separate from the tetravalent-sulphur salts, such as the sulphite or hyposulphite, and either diamines per se or parts of compounds which contain such diamines, or may be initially part of the tetravalent-sulphur salt, as by being in combination therewith. However, I deem it preferable that the diamines, whether present per se or as part of a co-present compound, shall be separate ingredients added to the tetravalent-sulphur salts, and some of my claims are directed to that preferred embodiment. Therefore, when in my claims I state merely that a diamine is present in the solution I intend to include all of these situations, because they are in effect in the same generic class; and when I intend to specify that the diamine is a separate added ingredient I specifically so state.

Various aliphatic diamines, unsubstituted or substituted, may be used for obtaining the stabil-

252. COMPOSITIONS,
402
SEARCH ROOM ized or stable tetravalent-sulphur salts. Among them are the following:

a. 1,2-ethylenediamine;

b. 1,2-propylenediamine;

c. N-phenylethylenediamine, represented by the formula:

(1) $C_6H_5$—NH—$CH_2$—$CH_2$—$NH_2$ d. 1,2-butylenediamine;

e. 1,3-propylenediamine;

f. Condensation products of such diamines with aldehydes; and g. Salts of such diamines, especially with weak acids.

Of these various aliphatic diamines, I prefer the 1,2-diamines, especially 1,2-ethylenediamine and 1,2-propylenediamine.

TABLE II

*Relative effects of copper, manganese, and iron on rate of oxidation of sodium sulphite, alkalinized with sodium hydroxide and with 1,2-ethylenediamine respectively*

Concentration of sodium sulphite—1:1000.

Concentration of sodium hydroxide, when used, is to give pH 9.

Concentration of ethylenediamine, when used, is 5 drops per 500 cc., which gives in excess of pH 9.

Iodine titre is given in cc. of 0.015N iodine solution per 5 cc. of sodium-sulphite solution. The accuracy of the iodine titrations is ±0.2 cc.

| Added metal ions | Sodium sulphite solution | Iodine titre | |
|---|---|---|---|
| | | Original | After 20 hours |
| None. | With added NaOH. | 2.43 | 0.10 |
| | With added ethylenediamine. | 4.59 | 4.60 |
| $Cu^{++}$ 1:200,000. | With added NaOH. | 4.30 | 0.06 |
| | With added ethylenediamine. | 4.45 | 4.30 (After 67 hours) |
| $Mn^{++}$ 1:200,000. | With added NaOH. | 3.41 | 1.13 |
| | With added ethylenediamine. | 4.37 | 3.87 |
| $Fe^{++}$ 1:50,000. | With added NaOH. | 2.70 | 0.96 |
| | With added ethylenediamine. | 4.34 | 4.31 |

The measure of deterioration of sulphites, by reason of oxidation, can be followed by their loss in iodine titre; and the measure of stabilization by relative constancy in iodine titre.

The stabilization of sodium-sulphite solutions against metal catalysis by added 1,2-ethylenediamine is shown in the following Tables I and II:

TABLE I

*Stabilization of sodium sulphite solutions by the addition of 1,2-ethylenediamine*

Concentration of sodium sulphite—1:1000.

Concentration of added copper ions, when copper is added—1:200,000.

Iodine titre given in cc. of 0.015N iodine solution per 5 cc. of sodium-sulphite solution. The accuracy of the iodine titrations is ±0.2 cc.

| Ethylenediamine added | Solution | Iodine titre | | |
|---|---|---|---|---|
| | | Original | Later—after time indicated | After 10 days |
| None. | Sodium sulphite. | 4.54 | 2.91 (2 hrs.) 0.00 (3 days) | -------- |
| | Sodium sulphite+copper sulphate. | 4.45 | 0.30 (8 hrs.) | -------- |
| None. | Sodium sulphite+NaOH to give pH 9. | 3.74 | 1.68 (2 hrs.) 0.00 (2 days) | -------- |
| | Sodium sulphite+NaOH to give pH 9+copper sulphate. | 3.28 | 0.00 (2 days) | -------- |
| None. | Sodium sulphite+$NH_4OH$ (5 drops per 500 cc.). | 4.33 | 3.86 (4 hrs.) 2.27 (22 hrs.) | -------- |
| | Sodium sulphite+$NH_4OH$ (5 drops per 500 cc.)+copper sulphate. | 2.77 | 1.71 (4 hrs.) 0.26 (22 hrs.) | -------- |
| Ethylenediamine to give pH 9. | Sodium sulphite. | 4.50 | 4.37 (3 days) | 3.89 |
| | Sodium sulphite+copper sulphate. | 4.45 | 3.30 (3 days) | 1.01 |
| Ethylenediamine in excess (5 drops per 500 cc.). | Sodium sulphite. | 4.41 | 4.43 (3 days) | 4.41 |
| | Sodium sulphite+copper sulphate. | 4.45 | 4.30 (3 days) | 4.19 |

The stabilization of sodium sulphite by added 1,2-propylenediamine and by added N-phenylethylenediamine, in contrast to that produced by ethanolamine (which also has some stabilizing effect), is shown in the following Table III:

TABLE III

*Stabilization of sodium sulphite solutions by the addition of ethanolamine, 1,2-propylenediamine, and N-phenylethylenediamine*

Concentration of sodium sulphite—1:1000.

Concentration of added copper ions, when copper is added—1:200,000.

Iodine titre given in cc. of 0.015N iodine solution per 5 cc. of sodium-sulphite solution. The accuracy of the iodine titrations is ±0.2 cc.

Concentration of added stabilizer—5 drops per 500 cc.

Concentration of diamine-aldehyde concentration products—1:1000.

| Added stabilizer | Solution | Iodine titre | | | |
|---|---|---|---|---|---|
| | | Original | After 24 hours | After 48 hours | After 120 hours |
| None. | Sodium sulphite+NaOH to give pH 9. | 4.65 | 0.21 | -------- | -------- |
| | Sodium sulphite+NaOH to give pH 9 + copper sulphate. | 2.23 | 1.10 | -------- | -------- |
| Ethanolamine. | Sodium sulphite. | 4.65 | 4.33 | 4.25 | 4.12 |
| | Sodium sulphite+copper sulphate. | 4.46 | 3.35 | 1.71 | 0.00 |
| 1, 2-propylene-diamine. | Sodium sulphite. | 4.50 | 4.53 | 4.37 | 4.25 |
| | Sodium sulphite+copper sulphate. | 4.48 | 4.50 | 4.33 | 4.10 |
| N-phenylethylene diamine. | Sodium sulphite. | 4.67 | 3.92 | 3.10 | 1.73 |
| | Sodium sulphite+copper sulphate. | 4.40 | 3.16 | 1.99 | 0.56 |

Similar effects are obtainable on other sulphites.

The stabilization of sodium hyposulphite ($Na_2S_2O_4$) by ethylenediamine in the presence of copper ions is shown by the following Table IV:

TABLE IV

*Effect of copper on rate of oxidation of sodium hyposulphite alkalinized with sodium hydroxide and with ethylenediamine respectively*

Concentration of sodium sulphite—1:1000.

Concentration of added copper ions—1:200,000.

Iodine titre given in cc. of 0.015N iodine solution per 5 cc. of sodium sulphite solution. The accuracy of the iodine titrations is ±0.2 cc.

| Solution | Iodine titre | | | |
|---|---|---|---|---|
| | Original | After bubbling air through— For 2 hours | After bubbling air through— For 5 hours | After standing 18 hours |
| Sodium hyposulphite+$CuSO_4$+NaOH to give pH 9.6 | 4.05 | 3.80 | 0.10 | 0.10 |
| Sodium hyposulphite+$CuSO_4$+ethylenediamine to give pH 9.6 | 4.08 | 4.07 | 4.04 | 4.16 |

This effect of aliphatic 1,2-diamines in stabilizing compounds against these metal catalysts persists in condensation products of such diamines with aldehydes—such as acetaldehyde, vanillin, salicyclic aldehyde, isobutyraldehyde, etc. This stabilization effect on sodium sulphite by these condensation products is illustrated in the following Table V.

TABLE V

*Stabilization of sodium sulphite solutions by condensation products of 1,2-diamines and aldehydes*

Concentration of sodium sulphite—1:1000.

Concentration of added copper ions—1:200,000.

Iodine titre given in cc. of 0.015N iodine solution per 5 cc. of sodium-sulphite solution. The accuracy of the iodine titrations is ±0.2 cc.

| Solution | Iodine titre | |
|---|---|---|
| | Original | After 20 hours |
| Sodium sulphite | 4.20 | 0.10 |
| Sodium sulphite+condensation product of ethylenediamine with acetaldehyde | 5.10 | 4.75 |
| Sodium sulphite+condensation product of propylenediamine with salicylic aldehyde | 4.90 | 4.34 |

Such condensation products of 1,2-diamines with aldehydes may be obtained in various ways. A convenient way is by treating an ether solution of the aldehyde with the desired diamine, such as ethylenediamine. In some cases a solid separates out, as in the case of propylenediamine with salicyclic aldehyde. This last-mentioned compound is a bright yellow solid, which melts at 118°–123° C. Ethylenediamine and salicyclic aldehyde also yield a bright yellow solid, which melts at about 125° C. Ethylenediamine and acetaldehyde yields a white solid, which melts at about 108° C.

In all of these stabilizations, the alphatic diamine probably exerts its inhibiting or stabilizing action by forming extremely stable complexes with the metallic ions, as of copper, manganese, and iron, and by thus preventing such ions from exerting their catalytic effect.

252. COMPOSITIONS. Cross Reference SEARCH ROOM
402

A sulphite or hyposulphite thus stabilized with an aliphatic diamine is effective to produce the desired stabilization of the easily oxidized benzenoid compounds the stabilization of which is the fundamental object of the present invention. All that one needs to do to stabilize those easily oxidized benzenoid compounds is to add thereto a small quantity of the stabilized sodium sulphite or stabilized sodium hyposulphite, or of a stable diamine sulphite.

The following three examples indicate the stabilizing action on some benzenoid compounds by a sodium sulphite stabilized with ethylenediamine.

*Example 1.*—A solution of 0.1 g. p-phenylenediamine in 100 cc. of water. The solution turned dark pink within five minutes; and upon standing three or four days became intensely red, and a dark brown precipitate had settled. By contrast, in an identical solution of 0.1 g. of p-phenylenediamine in 100 cc. of water in which there was also dissolved 0.4 g. of stabilized sodium sulphite (stabilized with ethylenediamine) the initially colorless solution was found to remain substantially colorless throughout the entire period of observation, here ten days. Moreover, if the solution of p-phenylenediamine in water was first prepared without the stabilized sodium sulphite, and discoloration occurred, that discoloring could be removed by adding the stabilized sodium sulphite later, up to at least four hours later; and the solution so produced was free of any appreciable color throughout a ten-day period of observation.

*Example 2.*—A solution of 0.1 g. hydroquinone in 100 cc. of water. The solution turned dark within five minutes; and upon standing three or four days became very dark brown. By contrast, in an identical solution of 0.1 g. of hydroquinone in 100 cc. of water in which there was also dissolved 0.4 g. of stabilized sodium sulphite (here again stabilized with ethylenediamine) the solution showed only a very faint brown tinge, and did not become darker or otherwise change in color during the ten days of observation. Moreover, if the dark-colored solution of hydroquinone, darkened by reason of the absence of any stabilized sodium sulphite, was later treated with stabilized sodium sulphite, up to at least 4 hours later, the discoloration almost disappeared, and the solution became only faintly tinged with brown, with no furthur change in color during the period of observation.

*Example 3.*—A solution of 0.1 g. catechol in 100 cc. of water. The solution turned yellow on standing overnight. By contrast, in an identical solution of 0.1 g. of catechol in 100 cc. of water in which there was also dissolved 0.4 g. of stabilized sodium sulphite (here again stabilized with ethylenediamine) the solution was colorless, and remained colorless for the ten-day period of observation. Moreover, if the colored solution of catechol was treated with stabilized sodium sulphite, the color disappeared, and did not reappear during the period of observation.

The following Table VI summarizes these three examples.

TABLE VI

*Effect of sodium sulphite stabilized by ethylenediamine on certain easily oxidized benzenoid compounds*

The extent of discoloration indicates the extent of decomposition.

Observations after standing in the light at room temperature.

| Solution | With ordinary $Na_2SO_3$ | With $Na_2SO_3$ stabilized with 1, 2-ethylenediamine |
|---|---|---|
| p-Phenylenediamine. | Dark pink to red. | Substantially colorless. |
| Hydroquinone | Dark brown. | Faint brown tinge. |
| Catechol | Yellow. | Colorless. |

The following Table VII illustrates the stabilization of p-phenylenediamine by sodium sulphite stabilized by propylenediamine against the effect of copper:

TABLE VII

*Effect of sodium sulphite stabilized by propylenediamine on p-phenylenediamine in the presence of copper*

Concentration of sodium sulphite—4:1000.

Concentration of p-phenylenediamine—1:1000.

Concentration of added copper ions, when copper is added—1:200,000.

| Added diamine | Solution | Original appearance | After heating to 100° C. | After standing for 48 hours |
|---|---|---|---|---|
| None. | p-Phenylenediamine + sodium sulphite. | Colorless. | Pink. | Pink. |
| | p-Phenylenediamine + sodium sulphite + copper sulphate. | Colorless. | Dark pink. | Brown. |
| Propylenediamine (1 drop per 100 cc.). | p-Phenylenediamine + sodium sulphite. | Colorless. | Colorless. | Colorless. |
| | p-Phenylenediamine + sodium sulphite + copper sulphate. | Pale purple: from copper-propylenediamine complex formed. | Substantially colorless. | Substantially colorless. |

It is desirable in the case of many of the benzenoid compounds which are easily oxidized that their solutions be capable of remaining colorless; and this has heretofore been difficult and in many cases impossible to effect, because the oxidation caused discoloring. The foregoing Tables VI and VII illustrate how discoloration can be largely if not wholly prevented. The same freedom from discoloration may be obtained with many others of these benzenoid compounds by having present my diamine-stabilized solution of an alkali-metal tetravalent-sulphur salt. This includes not only solutions of sodium sulphite and of sodium hyposulphite with added diamines, as considered in Tables I, II, III, IV, VI, and VII, but also such solutions of either sodium sulphite or sodium hyposulphite stabilized with condensation products of the diamines with aldehydes, as considered in Table V, as well as solutions of stable sulphites and hyposulphites described hereinafter.

It is of especial advantage in photography to have a colorless solution, as for a developer. When an ordinary developer containing p-phenylenediamine or hydroquinone and sodium sulphite is allowed to stand in the air, it quickly turns brown; due to the fact that sodium sulphite is used up at a great rate, and oxidation of p-phenylenediamine or the hydroquinone takes place. If instead of ordinary sodium sulphite, my stabilized sodium sulphite (containing a small amount of ethylenediamine for instance) is used, no such change in color takes place, and the solution can be kept in the light for days without undergoing any perceptible change in color.

In the preceding Tables I to VII inclusive, and in the preceding Examples 1 to 3 inclusive, the stabilization has been initially of an existing sulphite or hyposulphite with a diamine which was not part of the salt molecule. It is possible, however, to prepare a new and inherently stable type of tetravalent-sulphur salt—sulphite and or hyposulphite—from the aliphatic diamines, whereby the diamine enters into the salt molecule; and to use such inherently stable diamine tetravalent-sulphur salts to produce the desired stabilization of the easily oxidized benzenoid compounds. These diamine tetravalent-sulphur salts are stable even in the presence of the metal ion catalysts of copper, manganese, and iron, and even in a solution which is neutral or slightly alkaline—a property which is unique for tetravalent-sulphur salts.

These diamine salts may be prepared in various ways. The diamine sulphites may be prepared by causing the desired diamine to react with sulphur dioxide or sulphurous acid; and the diamine hyposulphites by electrolytic reduction of the diamine sulphites.

An example of these diamine salts is ethylenediamine sulphite. It is perhaps most simply prepared by passing sulphur dioxide into either an absolute or aqueous alcoholic solution of 1,2-ethylenediamine or into an acetone solution of such diamine; upon which the salt separates in solid form.

Ethylenediamine sulphite melts at 173–175° C., with decomposition. It is white, and quite soluble in water. The water solution is about pH 6.7. The analysis of the salt for nitrogen and sulphur indicates that it contains one mole of ethylenediamine to one mole of sulphurous acid. It is quite stable against metal catalysis, and is very effective as a stabilizer of those easily oxidizable benzenoid compounds which are unstable in the presence of ions of copper, manganese, or iron. It probably has the following formula:

(2)
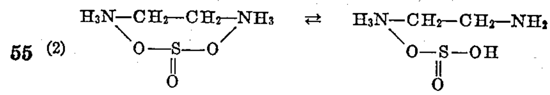

Another example is propylenediamine sulphite. It may be prepared analogously to ethylenediamine sulphite; and is similar thereto in most respects. It melts at 162° C., with decomposition. It also is quite stable against metal catalysis, and effective as a stabilizer of these benzenoid compounds.

Ethylenediamine hyposulphite may be obtained by reducing ethylenediamine sulphite.

These inherently stable sulphites or hyposulphites act substantially like my stabilized sodium sulphite and hyposulphite, to stabilize such benzenoid compounds as epinephrin, amino-phenols, p-phenylenediamine, etc. I have tried ethylenediamine sulphite for all the combinations which I have enumerated for obtaining stabilization by the use of my stabilized sodium sulphite; and find that such ethylenediamine sulphite is of substantially the same effectiveness as my stabilized sodium sulphite.

This action is illustrated by the following examples:

*Example 4.*—A 1:10,000 solution of epinephrin was divided into two parts, and one part was treated with three moles of ethylenediamine sulphite, and the other part used for a control. On heating for ten hours at 100° C., the part containing ethylenediamine sulphite remained colorless, while the control became quite dark.

Ethylenediamine sulphite has a marked advantage in stabilizing epinephrin, because it permits the epinephrin or epinephrinchloride solution to be neutral or even slightly alkaline, instead of acid. This unique proper of maintaining epinephrin preparations stable and colorless is quite important, for it is frequently desirable to use an epinephrin which is not at the acid pH at which, for the sake of stability, it is usually necessary to maintain it.

*Example 5.*—When 0.1 g. of p-phenylenediamine was dissolved in 100 cc. of water the solution turned pink within a few minutes, and upon standing for five days a dark brown precipitate settled out and the solution became intensely red and quite opaque. But when 0.3 g. of solid ethylenediamine sulphite was added to 0.1 g. of solid p-phenylenediamine, and the whole was dissolved in 100 cc. of water, a solution was obtained which was not only initially colorless but which remained colorless during the two weeks of observation.

*Example 6.*—Instead of using ethylenediamine sulphite as in Example 5, I may use 1,2-propylenediamine sulphite, and get the same results as indicated in Example 5 in the stabilization of p-phenylenediamine.

*Example 7.*—When 0.1 g. of p-amino phenol and 0.3 g. of ordinary (unstabilized) sodium sulphite were dissolved in 100 cc. of water, the solution become dark brown immediately. However, if instead of using such unstabilized sodium sulphite I use ethylenediamine sulphite, I avoid discoloration substantially completely; for on adding 0.1 g. of solid p-amino phenol to 0.3 g. of solid ethylenediamine sulphite, and dissolving the whole in 100 cc. of water, I get only a slight discoloring of the solution, and no additional discoloring during the period of two weeks during which observations were continued. Similar results were obtained with N-methyl-p-aminophenol (commonly known as metal).

*Example 8.*—When a strong alkaline solution of hydroquinone plus unstabilized sodium sulphite (such as is used in fine grain developers) is allowed to stand in the air, it rapidly assumes a black color; and when it is used in developing, the bath becomes practically unfit for use after about the third time. On the other hand, if instead of unstabilized sodium sulphite I employ either my stabilized sodium sulphite or 1,2-ethylenediamine sulphite or 1,2-propylenediamine sulphite, a solution is obtained which not only remains light-colored for weeks but which may also be used ten or twelve times as a developing bath. The stabilizing effect of the stable diamine sulphite is even more pronounced than that of sodium sulphite stabilized with ethylene diamine.

The various examples given of benzenoid compounds have in general been hydroxy-substituted or amino-substituted benzenoid compounds, with the substitution in the ortho position and/or in the para position; but these examples are not intended to limit the broad aspect of my invention.

252. COMPOSITIONS.
402
Cross Reference
SEARCH ROOM

For instance, pyrogallic acid, which is oxidizable but not as readily so as some of the other substances discussed, can readily be made more stable by the use of my stabilized or stable sulphites. So can naphthalene-substituted products. So also can certain derivatives of epinephrin and of ephedrine, such for instance as nor-epinephrin or 3,4-dioxy-nor-ephedrine, the structural formulas of which are as follows:

Nor-epinephrin:

(3)

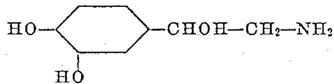

3,4-dioxy-nor-ephedrine:

(4)

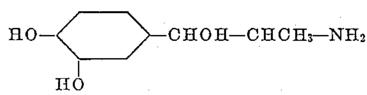

In other words, the examples which are given are intended to illustrate and not to limit the broader aspects of my invention.

I claim as my invention:

1. The process of stabilizing a solution of a hydroxy benzenoid compound which is easily oxidized by oxygen of the air, which consists in adding to such solution a tetravalent-sulphur salt which has an aliphatic 1,2-diamine present with it.

2. The process of stabilizing a solution of a hydroxy benzenoid compound which is easily oxidized by oxygen of the air, which consists in adding to such solution a sulphite which has an aliphatic 1,2-diamine present with it.

3. The process of stabilizing a solution of a hydroxy benzenoid compound which is easily oxidized by oxygen of the air, which consists in adding to such solution a hyposulphite which has an aliphatic 1,2-diamine present with it.

4. The process of stabilizing a solution of a hydroxy benzenoid compound which is easily oxidized by oxygen of the air, which consists in adding to such solution a sodium tetravalent-sulphur salt which has present with it an aliphatic 1,2-diamine as an added ingredient uncombined with the tetravalent-sulphur salt.

5. The process of stabilizing a solution of a hydroxy benzenoid compound which is easily oxidized by oxygen of the air, which consists in adding to such solution sodium sulphite which has present with it an aliphatic 1,2-diamine as an added ingredient uncombined with the sodium sulphite.

6. The process of stabilizing a solution of a hydroxy benzenoid compound which is easily oxidized by oxygen of the air, which consists in adding to such solution sodium hyposulphite which has present with it an aliphatic 1,2-diamine as an added ingredient uncombined with the sodium hyposulphite.

7. The process of stabilizing a solution of a hydroxy benzenoid compound which is easily oxidized by oxygen of the air, which consists in adding to such solution an aliphatic 1,2-diamine tetravalent-sulphur salt.

8. The process of stabilizing a solution of a hydroxy benzenoid compound which is easily oxidized by oxygen of the air, which consists in adding to such solution an aliphatic 1,2-diamine sulphite.

9. The process of stabilizing a solution of a hydroxy benzenoid compound which is easily oxidized by oxygen of the air, which consists in adding to such solution 1,2-ethylenediamine sulphite.

10. The process of stabilizing a solution of a hydroxy benzenoid compound which is easily oxidized by oxygen of the air, which consists in adding to such solution 1,2-propylenediamine sulphite.

11. A composition of matter, comprising a water solution of a tetravalent-sulphur salt, in which water solution there is present an aliphatic 1,2-diamine.

12. A composition of matter, comprising a water solution of a sulphate, in which water solution there is present an aliphatic 1,2-diamine.

13. A composition of matter comprising a water solution of a hyposulphite, in which water solution there is present an aliphatic 1,2-diamine.

14. A composition of matter, comprising a water solution of a sodium tetravalent-sulphur salt, in which water solution there is present an aliphatic 1,2-diamine as an added ingredient uncombined with the tetravalent-sulphur salt.

15. A composition of matter, comprising a water solution of sodium sulphite, in which water solution there is present an aliphatic 1,2-diamine as an added ingredient uncombined with the sodium sulphite.

16. A composition of matter, comprising a water solution of sodium hyposulphite, in which water solution there is present an aliphatic 1,2-diamine as an added ingredient uncombined with the sodium hyposulphite.

17. A composition of matter, comprising a solution of a hydroxy benzenoid compound which is easily oxidized by oxygen of the air, in which solution there is a tetravalent-sulphur salt which has an aliphatic 1,2-diamine present with it.

18. A composition of matter, comprising a solution of a hydroxy benzenoid compound which is easily oxidized by oxygen of the air, in which solution there is a sulphite which has an aliphatic 1,2-diamine present with it.

19. A composition of matter, comprising a solution of a hydroxy benzenoid compound which is easily oxidized by oxygen of the air, in which solution there is a hyposulphite which has an aliphatic 1,2-diamine present with it.

20. A composition of matter, comprising a solution of a hydroxy benzenoid compound which is easily oxidized by oxygen of the air, in which solution there is a sodium tetravalent-sulphur salt which has present with it an aliphatic 1,2-diamine as an added ingredient.

21. A composition of matter, comprising a solution of a hydroxy benzenoid compound which is easily oxidized by oxygen of the air, in which solution there is sodium sulphite which has present with it an aliphatic 1,2-diamine as an added ingredient.

22. A composition of matter, comprising a solution of a hydroxy benzenoid compound which is easily oxidized by oxygen of the air, in which solution there is sodium hyposulphite which has present with it an aliphatic 1,2-diamine as an added ingredient.

23. A composition of matter, comprising a solution of a hydroxy benzenoid compound which is easily oxidized by oxygen of the air, in which solution there is an aliphatic 1,2-diamine tetravalent-sulphur salt.

24. A composition of matter, comprising a solution of a hydroxy benzenoid compound which is easily oxidized by oxygen of the air, in which solution there is an aliphatic 1,2-diamine sulphite.

25. A composition of matter, comprising a solution of a hydroxy benzenoid compound which is easily oxidized by oxygen of the air, in which solution there is 1,2-ethylenediamine sulphite.

26. A composition of matter, comprising a solution of a hydroxy benzenoid compound which is easily oxidized by oxygen of the air, in which solution there is 1,2-propylenediamine sulphite.

27. A composition of matter, comprising a solution which includes as solutes hydroquinone and a tetravalent-sulphur salt which has an aliphatic 1,2-diamine present with it.

28. A composition of matter, comprising a solution which includes as solutes hydroquinone and a sulphite which has an aliphatic 1,2-diamine present with it.

29. A composition of matter, comprising a solution which includes as solutes hydroquinone and a hyposulphite which has an aliphatic 1,2-diamine present with it.

30. A composition of matter, comprising a solution which includes as solutes a benzenoid compound of the class consisting of o-aminophenol, p-aminophenol, p-phenylenediamine, catechol, hydroquinone, metol, and epinephrine, and a tetravalent-sulphur salt which has an aliphatic 1,2-diamine present with it.

31. A composition of matter, comprising a solution which includes as solutes a benzenoid compound of the class consisting of o-aminophenol, p-aminophenol, p-phenylenediamine, catechol, hydroquinone, metol, and epinephrine, and a sulphate which has an aliphatic 1,2-diamine present with it.

32. A composition of matter, comprising a solution which includes as solutes a benzenoid compound of the class consisting of o-aminophenol, p-aminophenol, p-phenylenediamine, catechol, hydroquinone, metol, and epinephrine, and a hyposulphite which has an aliphatic 1,2-diamine present with it.

MORRIS S. KHARASCH.

CERTIFICATE OF CORRECTION.

Patent No. 2,130,322. September 13, 1938.

MORRIS S. KHARASCH.

It is hereby certified that error appears in the printed specification of the above numbered patent requiring correction as follows: Page 1, first column, line 23, for the word "metal" read metol; page 2, first column, line 1, beginning with the syllable and words "ized or stable" strike out all to and including "sodium" in line 75, second column of page 4, and insert instead the following - ized or stable tetravalent-sulphur salts. Among them are the following:

*a.* 1,2-ethylenediamine;

*b.* 1,2-propylenediamine;

*c.* N-phenylethylenediamine, represented by the formula:

$$(1)\quad C_6H_5—NH—CH_2—CH_2—NH_2$$

*d.* 1,2-butylenediamine;

*e.* 1,3-propylenediamine;

*f.* Condensation products of such diamines with aldehydes; and

*g.* Salts of such diamines, especially with weak acids.

Of these various aliphatic diamines, I prefer the 1,2-diamines, especially 1,2-ethylenediamine and 1,2-propylenediamine.

The measure of deterioration of sulphites, by reason of oxidation, can be followed by their loss in iodine titre; and the measure of stabilization by relative constancy in iodine titre.

The stabilization of sodium-sulphite solutions against metal catalysis by added 1,2-ethylenediamine is shown in the following Tables I and II:

TABLE I

*Stabilization of sodium sulphite solutions by the addition of 1,2-ethylenediamine*

Concentration of sodium sulphite—1:1000.

Concentration of added copper ions, when copper is added—1:200,000.

Iodine titre given in cc. of 0.015N iodine solution per 5 cc. of sodium-sulphite solution. The accuracy of the iodine titrations is ±0.2 cc.

| Ethylenediamine added | Solution | Iodine titre | | |
|---|---|---|---|---|
| | | Original | Later—after time indicated | After 10 days |
| None. | Sodium sulphite. | 4.54 | 2.91 (2 hrs.)<br>0.00 (3 days) | -------- |
| | Sodium sulphite+copper sulphate. | 4.45 | 0.30 (8 hrs.) | -------- |
| None. | Sodium sulphite+NaOH to give pH 9. | 3.74 | 1.68 (2 hrs.)<br>0.00 (2 days) | -------- |
| | Sodium sulphite+NaOH to give pH 9+copper sulphate. | 3.28 | 0.00 (2 days) | -------- |
| None. | Sodium sulphite+$NH_4OH$ (5 drops per 500 cc.). | 4.33 | 3.86 (4 hrs.)<br>2.27 (22 hrs.) | -------- |
| | Sodium sulphite+$NH_4OH$ (5 drops per 500 cc.)+copper sulphate. | 2.77 | 1.71 (4 hrs.)<br>0.06 (22 hrs.) | -------- |
| Ethylenediamine to give pH 9. | Sodium sulphite. | 4.50 | 4.37 (3 days) | 3.89 |
| | Sodium sulphite+copper sulphate. | 4.45 | 3.30 (3 days) | 1.01 |
| Ethylenediamine in excess (5 drops per 500 cc.). | Sodium sulphite. | 4.41 | 4.43 (3 days) | 4.41 |
| | Sodium sulphite+copper sulphate. | 4.45 | 4.30 (3 days) | 4.19 |

TABLE II

*Relative effects of copper, manganese, and iron on rate of oxidation of sodium sulphite, alkalinized with sodium hydroxide and with 1,2-ethylenediamine respectively*

Concentration of sodium sulphite—1:1000.

Concentration of sodium hydroxide, when used, is to give pH 9.

Concentration of ethylenediamine, when used, is 5 drops per 500 cc., which gives in excess of pH 9.

Iodine titre is given in cc. of 0.015N iodine solution per 5 cc. of sodium-sulphite solution. The accuracy of the iodine titrations is ±0.2 cc.

| Added metal ions | Sodium sulphite solution | Iodine titre | |
|---|---|---|---|
| | | Original | After 20 hours |
| None. | With added NaOH. | 2.43 | 0.10 |
| | With added ethylenediamine. | 4.59 | 4.60 |
| $Cu^{++}$ 1:200,000. | With added NaOH. | 4.30 | 0.06 |
| | With added ethylenediamine. | 4.45 | 4.30 (After 67 hours) |
| $Mn^{++}$ 1:200,000. | With added NaOH. | 3.41 | 1.13 |
| | With added ethylenediamine. | 4.37 | 3.87 |
| $Fe^{++}$ 1:50,000. | With added NaOH. | 2.70 | 0.96 |
| | With added ethylenediamine. | 4.34 | 4.31 |

The stabilization of sodium sulphite by added 1,2-propylenediamine and by added N-phenylethylenediamine, in contrast to that produced by ethanolamine (which also has some stabilizing effect), is shown in the following Table III:

TABLE III

*Stabilization of sodium sulphite solutions by the addition of ethanolamine, 1,2-propylenediamine, and N-phenylethylenediamine*

Concentration of sodium sulphite—1:1000.

Concentration of added copper ions, when copper is added—1:200,000.

Iodine titre given in cc. of 0.015N iodine solution per 5 cc. of sodium-sulphite solution. The accuracy of the iodine titrations is ±0.2 cc.

Concentration of added stabilizer—5 drops per 500 cc.

| Added stabiliser | Solution | Iodine titre | | | |
|---|---|---|---|---|---|
| | | Original | After 24 hours | After 48 hours | After 120 hours |
| None. | Sodium sulphite+NaOH to give pH 9. | 4.65 | 0.21 | ------ | ------ |
| | Sodium sulphite+NaOH to give pH 9 + copper sulphate. | 1.23 | 1.10 | ------ | ------ |
| Ethanolamine. | Sodium sulphite. | 4.65 | 4.33 | 4.25 | 4.12 |
| | Sodium sulphite+copper sulphate. | 4.46 | 3.35 | 1.71 | 0.00 |
| 1, 2-propylene-diamine. | Sodium sulphite. | 4.80 | 4.53 | 4.37 | 4.25 |
| | Sodium sulphite+copper sulphate. | 4.48 | 4.50 | 4.33 | 4.10 |
| N-phenylethylene diamine. | Sodium sulphite. | 4.67 | 3.92 | 3.10 | 1.73 |
| | Sodium sulphite+copper sulphate. | 4.40 | 3.16 | 1.99 | 0.56 |

Similar effects are obtainable on other sulphites.

The stabilization of sodium hyposulphite ($Na_2S_2O_4$) by ethylenediamine in the presence of copper ions is shown by the following Table IV:

TABLE IV

*Effect of copper on rate of oxidation of sodium hyposulphite alkalinized with sodium hydroxide and with ethylenediamine respectively*

Concentration of sodium sulphite—1:1000.

Concentration of added copper ions—1:200,000.

Iodine titre given in cc. of 0.015N iodine solution per 5 cc. of sodium sulphite solution. The accuracy of the iodine titrations is ±0.2 cc.

| Solution | Iodine titre | | | |
|---|---|---|---|---|
| | Original | After bubbling air through— | | After standing 18 hours |
| | | For 2 hours | For 5 hours | |
| Sodium hyposulphite+$CuSO_4$+NaOH to give pH 9.6 | 4.66 | 3.80 | 0.10 | 0.10 |
| Sodium hyposulphite+$CuSO_4$+ethylenediamine to give pH 9.6 | 4.68 | 4.07 | 4.04 | 4.16 |

This effect of aliphatic 1,2-diamines in stabilizing compounds against these metal catalysts persists in condensation products of such diamines with aldehydes—such as acetaldehyde, vanillin, salicylic aldehyde, isobutyraldehyde, etc. This stabilization effect on sodium sulphite by these condensation products is illustrated in the following Table V.

TABLE V

*Stabilization of sodium sulphite solutions by condensation products of 1,2-diamines and aldehydes*

Concentration of sodium sulphite—1:1000.

Concentration of added copper ions—1:200,000.

Concentration of diamine-aldehyde concentration products—1:1000.

Iodine titre given in cc. of 0.015N iodine solution per 5 cc. of sodium-sulphite solution. The accuracy of the iodine titrations is ±0.2 cc.

| Solution | Iodine titre | |
|---|---|---|
| | Original | After 20 hours |
| Sodium sulphite | 4.20 | 0.10 |
| Sodium sulphite+condensation product of ethylenediamine with acetaldehyde | 5.10 | 4.75 |
| Sodium sulphite+condensation product of propylenediamine with salicylic aldehyde | 4.90 | 4.34 |

*Example 3.*—A solution of 0.1 g. catechol in 100 cc. of water. The solution turned yellow on standing overnight. By contrast, in an identical solution of 0.1 g. of catechol in 100 cc. of water in which there was also dissolved 0.4 g. of stabilized sodium sulphite (here again stabilized with ethylenediamine) the solution was colorless, and remained colorless for the ten-day period of observation. Moreover, if the colored solution of catechol was treated with stabilized sodium sulphite, the color disappeared, and did not reappear during the period of observation.

The following Table VI summarizes these three examples.

TABLE VI

*Effect of sodium sulphite stabilized by ethylenediamine on certain easily oxidized benzenoid compounds*

The extent of discoloration indicates the extent of decomposition.

Observations after standing in the light at room temperature.

| Solution | With ordinary $Na_2SO_3$ | With $Na_2SO_3$ stabilized with 1, 2-ethylenediamine |
|---|---|---|
| p-Phenylenediamine. | Dark pink to red. | Substantially colorless. |
| Hydroquinone | Dark brown. | Faint brown tinge. |
| Catechol | Yellow. | Colorless. |

The following Table VII illustrates the stabilization of p-phenylenediamine by sodium sulphite stabilized by propylenediamine against the effect of copper:

TABLE VII

*Effect of sodium sulphite stabilized by propylenediamine on p-phenylenediamine in the presence of copper*

Concentration of sodium sulphite—4:1000.

Concentration of p-phenylenediamine—1:1000.

Concentration of added copper ions, when copper is added—1:200,000.

| Added diamine | Solution | Original appearance | After heating to 100° C. | After standing for 48 hours |
|---|---|---|---|---|
| None. | p-Phenylenediamine + sodium sulphite. | Colorless. | Pink. | Pink. |
| | p-Phenylenediamine + sodium sulphite + copper sulphate. | Colorless. | Dark pink. | Brown. |
| Propylenediamine (1 drop per 100 cc.). | p-Phenylenediamine + sodium sulphite. | Colorless. | Colorless. | Colorless. |
| | p-Phenylenediamine + sodium sulphite + copper sulphate. | Pale purple: from copper-propylenediamine complex formed. | Substantially colorless. | Substantially colorless. |

It is desirable in the case of many of the benzenoid compounds which are easily oxidized that their solutions be capable of remaining colorless; and this has heretofore been difficult and in many cases impossible to effect, because the oxidation caused discoloring. The foregoing Tables VI and VII illustrate how discoloration can be largely if not wholly prevented. The same freedom from discoloration may be obtained with many others of these benzenoid compounds by having present my diamine-stabilized solution of 2,130,322

Such condensation products of 1,2-diamines with aldehydes may be obtained in various ways. A convenient way is by treating an ether solution of the aldehyde with the desired diamine, such as ethylenediamine. In some cases a solid separates out, as in the case of propylenediamine with salicylic aldehyde. This last-mentioned compound is a bright yellow solid, which melts at 118°–123° C. Ethylenediamine and salicylic aldehyde also yield a bright yellow solid, which melts at about 125° C. Ethylenediamine and acetaldehyde yield a white solid, which melts at about 108° C.

In all of these stabilizations, the aliphatic diamine probably exerts its inhibiting or stabilizing action by forming extremely stable complexes with the metallic ions, as of copper, manganese, and iron, and by thus preventing such ions from exerting their catalytic effect.

A sulphite or hyposulphite thus stabilized with an aliphatic diamine is effective to produce the desired stabilization of the easily oxidized benzenoid compounds the stabilization of which is the fundamental object of the present invention. All that one needs to do to stabilize those easily oxidized benzenoid compounds is to add thereto a small quantity of the stabilized sodium sulphite or stabilized sodium hyposulphite, or of a stable diamine sulphite.

The following three examples indicate the stabilizing action on some benzenoid compounds by a sodium sulphite stabilized with ethylenediamine.

*Example 1.*—A solution of 0.1 g. p-phenylenediamine in 100 cc. of water. The solution turned dark pink within five minutes; and upon standing three or four days became intensely red, and a dark brown precipitate had settled. By contrast, in an identical solution of 0.1 g. of p-phenylenediamine in 100 cc. of water in which there was also dissolved 0.4 g. of stabilized sodium sulphite (stabilized with ethylenediamine) the initially colorless solution was found to remain substantially colorless throughout the entire period of observation, here ten days. Moreover, if the solution of p-phenylenediamine in water was first prepared without the stabilized sodium sulphite, and discoloration occurred, that discoloring could be removed by adding the stabilized sodium sulphite later, up to at least four hours later; and the solution so produced was free of any appreciable color throughout a ten-day period of observation.

*Example 2.*—A solution of 0.1 g. hydroquinone in 100 cc. of water. The solution turned dark within five minutes; and upon standing three or four days became very dark brown. By contrast, in an identical solution of 0.1 g. of hydroquinone in 100 cc. of water in which there was also dissolved 0.4 g. of stabilized sodium sulphite (here again stabilized with ethylenediamine) the solution showed only a very faint brown tinge, and did not become darker or otherwise change in color during the ten days of observation. Moreover, if the dark-colored solution of hydroquinone, darkened by reason of the absence of any stabilized sodium sulphite, was later treated with stabilized sodium sulphite, up to at least 4 hours later, the discoloration almost disappeared, and the solution became only faintly tinged with brown, with no furthur change in color during the period of observation.

an alkali-metal tetravalent-sulphur salt. This includes not only solutions of sodium sulphite and of sodium hyposulphite with added diamines, as considered in Tables I, II, III, IV, VI, and VII, but also such solutions of either sodium sulphite or sodium hyposulphite stabilized with condensation products of the diamines with aldehydes, as considered in Table V, as well as solutions of stable sulphites and hyposulphites described hereinafter.

It is of especial advantage in photography to have a colorless solution, as for a developer. When an ordinary developer containing p-phenylenediamine or hydroquinone and sodium ;

page 5, first column, line 17, strike out "and" before "or"; line 53, in the formula, for "$\rightleftarrows$" read $\rightleftharpoons$; and second column, line 16, for "proper" read property; line 42, for "become" read became; line 53, for "metal" read metol; page 6, second column, line 13, and page 7, second column, line 11-12, claims 12 and 31 respectively, for "sulphate" read sulphite; and that the said Letters Patent should be read with this correction therein that the same may conform to the record of the case in the Patent Office.

Signed and sealed this 24th day of January, A.D. 1939.

Henry Van Arsdale (Seal) Acting Commissioner of Patents.